(12) United States Patent
Wilson

(10) Patent No.: US 6,179,488 B1
(45) Date of Patent: *Jan. 30, 2001

(54) SOFTWARE EXECUTION SYSTEMS

(75) Inventor: John Wilson, Wokingham (GB)

(73) Assignee: Synopsys, Inc., Mountain View, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/247,336

(22) Filed: Feb. 10, 1999

Related U.S. Application Data

(62) Continuation of application No. 09/080,294, filed on May 18, 1998, now abandoned, which is a continuation of application No. 08/549,720, filed as application No. PCT/GB95/00603 on Mar. 20, 1995, now abandoned.

(30) Foreign Application Priority Data

Mar. 23, 1994 (GB) .................................................. 9405729

(51) Int. Cl.[7] ........................................................ G06F 3/00
(52) U.S. Cl. ................................ 395/500.43; 395/500.45; 395/500.47; 395/704; 395/705; 395/708
(58) Field of Search .................. 395/500.43, 500.45, 395/500.47, 704, 705, 708, 183.01, 183.03, 183.04, 183.07, 183.08, 183.16

(56) References Cited

U.S. PATENT DOCUMENTS

| | | |
|---|---|---|
| 4,785,416 | 11/1988 | Stringer . |
| 4,812,975 | 3/1989 | Adachi et al. . |
| 5,077,657 | 12/1991 | Cooper et al. . |
| 5,287,515 | 2/1994 | Murai . |
| 5,301,302 | 4/1994 | Blackard et al. . |
| 5,613,098 | 3/1997 | Landau et al. . |
| 5,652,869 | 7/1997 | Herdeg et al. . |

OTHER PUBLICATIONS

R.K. Gupta et al., "Synthesis and Simulation of Digital Systems Containing Interacting Hardware and Software Coponents," pp.225–230, 29th ACM/IEEE Design Automation Conference,1992. 1992. 1992.

K. Keutzer, "Hardware–Software Co–Design and ESDA, " pp. 435–436, 31st ACM/IEEE Design Automation Conference, 1994.

Serge A. Leef, "Architectural Outline, SEAMLESS," (Mentor Graphics document), pp. 1–19, publication date: unknown.

A. Kalavade et al., "Manifestation of Heterogeneity in Hardware/Software Codesign," pp. 437–438, 31st ACM/IEEE Design Automation Confrence, 1994.

Application–Program Behaviour Analysis, IBM Technical Disclosure Bulletin, vol. 31, No. 3, pp. 274–278.

*Primary Examiner*—Eric W. Stamber
*Assistant Examiner*—Doug Sergent
(74) *Attorney, Agent, or Firm*—Young & Thompson

(57) ABSTRACT

A system 10 for executing a software program includes a simulator 15 for simulating a specific processor; a processing means 13 for executing non-specific parts of the program and including means for identifying those parts of the program which require execution by the specific processor; and a bidirectional bus 14 for feeding the identified program parts to the simulator 15 and for returning any resultant response to the processing means 13.

19 Claims, 1 Drawing Sheet

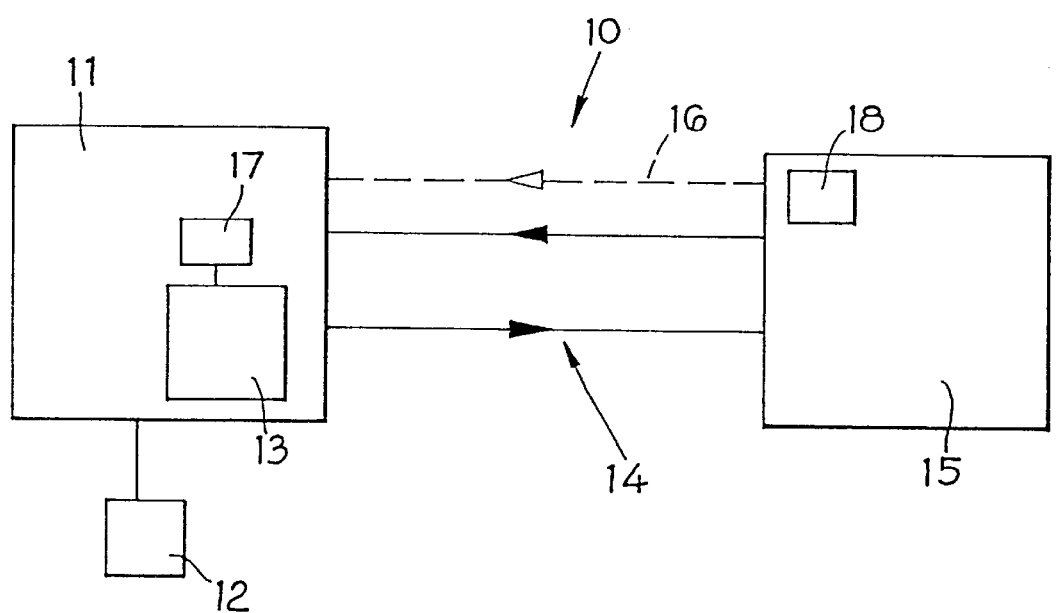

SOFTWARE EXECUTION SYSTEMS

CROSS-REFERENCE TO RELATED APPLICATIONS

This application is a continuation of application Ser. No. 09/080,294, filed May 18, 1998, now abandoned which is a continuation of Ser. No. 08/549,720, filed Nov. 14, 1995 now abandoned, filed as PCT/GB95/00603 filed Mar. 30, 1995.

BACKGROUND OF THE INVENTION

This invention relates to a system for and methods of executing a software program.

It is becoming more and more common for Processors Manufacturer to release the design criteria of a new processor a considerable time before the processor is available in hardware form and in particular before the internal circuitry of the processor is known. (The term processor includes microprocessors, digital signal processors, microcode processors and any other programmable sequenced-based digital circuitry). One example is Intelt's PENTIUM (Registered Trade Mark). Software Designers are obviously keen to have software available for such new processors as soon as devices incorporating them come on to the market. Equally hardware Designers wish to know whether they can use the new processor with particular software and peripheral hardware. Attempts at simulating processors have been made but these are very limited in their application and in particular tend to require a knowledge of the internal architecture of the processor before any steps can be taken. They may also require the creation of a compiler for that particular processor.

SUMMARY OF THE INVENTION

From one aspect the invention consists in a system for executing a software program including a simulator for simulating a specific processor, a processing means for executing the non-specific parts of the program and including means for identifying those parts of the program which require execution by the specific processor and a bidirectional bus, or other communication channel, for feeding the identified program parts to the simulator and for returning any resultant response to the processing means.

The invention also includes a method of testing or evaluating software on a simulated specific processor including the steps of executing the program on an existing processor, identifying program parts which require processing by the specific processor, feeding these program parts to the simulator and returning any resultant simulated response to the existing processor.

It will thus be seen that with the present invention a completely novel approach is used in that a general purpose and existing processor is combined with a simulator and the latter is configured only to simulate those interactions and responses which are specific to the simulated processor; all other parts of the program being executed on the general purpose processor.

This fresh approach to the problem not only significantly reduces the effort and time required to create the simulator, it also enables a simulator to be created purely with the knowledge of the design criteria of the new processor; the internal architecture of that device is irrelevant.

This approach arises from the realization that a substantial number of the functions performed by any processor when executing a program are non-specific, i.e. it does not matter which processor is used. Further, the steps which are specific are readily identified because they all involve interactions with peripheral hardware, for example, key-boards, mice and screens. A further advantage of this approach is that it is possible to perform the simulated interactions in a high level language.

Thus in a preferred embodiment the identified parts of the program are those which cause the specific processor to interact with the associated peripheral hardware. In many programs these identified parts may be sub-programs, because it is common programming practice to have a set of sub-programs to handle the interactions between a processor and peripheral hardware. Typically these identified parts are software or peripheral drivers.

Where the program is configured with such sub-programs, the system may further comprise a cross-compiler for compiling the existing sub-programs, prior to the sub-programs being fed to the bus, into a format or code suitable for interaction with the specific processor.

Preferably the simulator only simulates the responses of interactions with the identified parts of the program. Thus the simulator may be a processor or software model programmed to respond in accordance with the design response of the specific processor or it may be dedicated hardware designed to provide such responses.

Although the invention has been defined above it is to be understood it includes any inventive combination of the features set out above or in the following description.

BRIEF DESCRIPTION OF THE DRAWINGS

The invention may be performed in various ways and specific embodiments will now be described, by way of example, with reference to the accompanying drawing, which is a schematic representation of the system.

DESCRIPTION OF THE PREFERRED EMBODIMENTS

Thus a system 10 comprises a computer 11, having a software input 12 and a processor 13; a bidirectional bus 14 and a simulator 15.

As has already been indicated the simulator 15 is designed to receive code or program parts which have to interact with peripheral hardware to be associated with the simulated processor and to provide the design responses that would be developed by the actual processor if it had processed such code or program part. This simulator 15 may be in the form of a computer model or it may be a hardware black box which can emulate the different processor bus cycles in response to the messages given over the communication channel and which can report back the changes at the processor interface signals, i.e. the pins.

This form of simulator is possible because of the realization that the processor can be split into two distinct parts; the essential processor circuit (usually the processor, some RAM and ROM, and some associated logic without which the processor could not operate); and the peripheral circuit which is used to dedicate the processor system to a particular function.

The software program, which is built to execute on the specific or target processor or processor system, will have some parts of the code written, specifically, to interact with the peripheral hardware. If this program is written in a high-level language, it can be compiled to run on many different computer systems or processor systems. Only the code associated with the peripheral circuits or hardware prevents the program from being fully functional on the different target processor or processor system.

Cross-compilation techniques allow the code associated with the peripheral circuits or hardware to be replaced with equivalent, alternative, code at compilation time. The alternative code, instead of interacting directly with the hardware, causes a high level message to be sent to the bidirectional bus that links the software with the simulator 15. Removing the code that relates directly to the hardware peripherals allows the remainder program to be executed on any general purpose computer for which a compiler exists.

The "black box", or simulator 15 which replaces the processor in the processor system, responds to the processor-cycle based messages from the communications channel 14 and translates that into an emulation of the responses of the specific processor. No attempt is made to emulate or model the internal workings of the specific processor.

The effect is that the software program will execute on the general purpose computer 13 until code that has to interact with the peripheral hardware is encountered. For this section of code only, the simulator 15 will be activated and respond as if the specific processor was in the circuit.

This allows software to be built and executed before the specific processor system is ready. Where the specific processor is represented as a computer model, removing the overhead of executing the part of the software program which does not interact with the peripheral circuit from the computer simulation can significantly reduce the elapsed time required to verify and debug the software program, and the interaction of the software program and the peripheral circuit. No detailed representation of the specific processor is required for this technique to work.

For software programs written in a high level language, a programming style based on subprograms is frequently used. A subprogram specifies a set of actions that have to be executed many times over, in many different circumstances. calling the subprogram allows the programmer to concentrate on what he wants the program to do rather than worry about the mechanism required to carry out the actions.

For software programs that interact with peripheral hardware, it is normal for a number of subprograms to be written to carry out the detailed interaction with the peripheral hardware. The software programmer will write his program to interact with the peripheral hardware using the subprograms. This can significantly reduce the program complexity.

To prepare the program for execution, a compilation process will translate the high level language program into binary symbols that are suitable for one particular process or type only. Different compilers are required for different processor types. The compilation process involves translating each of the program modules into the equivalent binary representation, and then linking the different binary modules together to produce a complete executable program.

The present invention allows that a new program module is written in parallel to the program module containing the subprograms that interact with the peripheral circuit. The names and interfaces to the subprograms in each module are the same. The operations specified in the subprograms are different. Executing the new subprograms cause one or more processor-cycle based messages to be sent to the communications channel. For some of these processor-cycles, some response can be expected back from the channel 14.

This new equivalent module can be linked into the program at the compilation stage, in place of the subprograms that interact with the peripheral circuit directly.

Removing the peripheral circuit or hardware specific code allows the software program to be executed on any computer system for which a compiler is available.

The new subprograms, which are now linked into the software program, interact with the communications channel instead. It is not possible for the software program to tell if the peripheral circuit exists in the computer on which the software is executing because all the instructions that directly relate to the peripheral circuit are contained within the subprograms only.

Where it is necessary to handle asynchronous interrupts a further communication channel 16 from the simulator 15 to the computer 11 is included.

Asynchronous interrupts arriving at the simulator 15 can be handled by adding the further communications channel 16 that passes an interrupt message back to the computer 11 from the simulator 15. It can be arranged that the delivery of this message will cause a software interrupt in the software program. Thus interrupt signals arriving at the simulator 15 can be delivered directly to the software program to be handled by an interrupt handler written into the user program.

Because of the asynchronous nature of interrupts, it is vital to ensure the correct prioritization of interrupt messages over normal messages (i.e. identified program part). A simple method of implementing the prioritization is to append the interrupt priority to every message, and to maintain separate queues (FIFOs) for messages passed at the different interrupt levels. The simulator 15 always takes the first available instruction from the highest priority queue. This technique allows full interrupt driven code to be sequenced correctly between the simulator 15 and the software program. Means 17, 18 respectively are provided for prioritizing and for providing FIFO control.

What is claimed is:

1. A system for executing a software program including a simulator for simulating a target processor, processing means for executing parts of the program which are non-specific to the target processor and including means for identifying those parts of the program which require execution by the target processor; and a bi-directional bus or other communication channel, for feeding the identified program parts to the simulator and returning any resultant response to the processing means.

2. A system as claimed in claim 1 wherein the identified parts to the program are those which cause the target processor to interact with at least one associated peripheral element.

3. A system as claimed in claim 1 wherein the identified parts of the program are sub-programs.

4. A system as claimed in claim 3 further comprising a cross-compiler for compiling existing sub-programs, prior to their being fed via the bus, into a format or code suitable for interaction with the target processor.

5. A system as claimed in claim 1 wherein the identified parts of the program include drivers.

6. A system as claimed in claim 1 wherein the identified parts of the program are in a high level language when fed to the simulator.

7. A system as claimed in claim 1 wherein the simulator only simulates the responses of interactions with the identified parts of the program.

8. A system as claimed in claim 1 wherein the simulator is a processor programmed to respond in accordance with the design response of the target processor.

9. A system as claimed in claim 1 wherein the simulator is a dedicated hardware simulator.

10. A system as claimed in claim 1 further including a further communication channel between the simulator and the processing means for handling asynchronous interrupts.

11. A system as claimed in claim 10 wherein the interrupts are given a higher priority than other identified program parts.

12. A system as claimed in claim 10 further including means for prioritizing every identified program part.

13. A system as claimed in claim 12 further including First in First Out data handling means for each interrupt level.

14. A method of testing or evaluating software program on a simulated target processor, including the steps of executing the program on an existing processor, identifying program parts which require processing by the target processor, feeding these program parts to the simulator and returning any resultant simulated response to the existing processor.

15. A method as claimed in claim 14 wherein the identified parts of the program are those which cause the target processor to interact with at least one associated peripheral element.

16. A system as claimed in claim 2 wherein the peripheral element is peripheral hardware.

17. A system as claimed in claim 2 wherein the peripheral element is a peripheral circuit.

18. A system as claimed in claim 2 wherein there are a plurality of peripheral elements including peripheral hardware and peripheral circuits.

19. A system for executing a software program including a simulator for simulating a target processor; a processing means for executing parts of the program which are non-specific to the target processor and including means for identifying those parts of the program which cause the target processor to interact with at least one associated peripheral element; and a bi-directional communication channel, for feeding the identified program parts to the simulator and for returning any resultant response to the processing means.

* * * * *